May 10, 1949.  W. GIESE  2,469,822
PROCESS FOR BONDING TEETH TO DENTAL PLATES
Filed Aug. 31, 1946
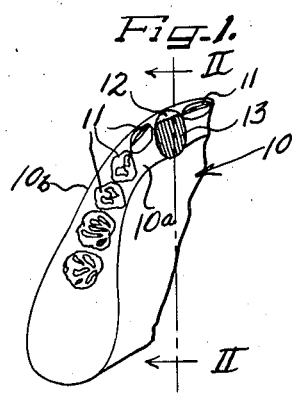
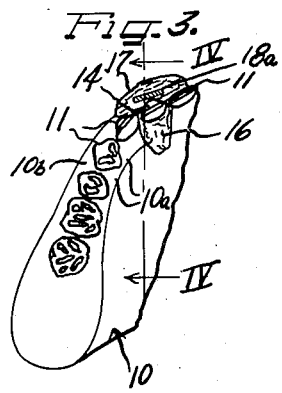
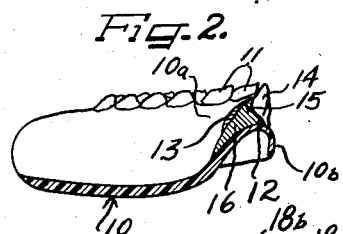
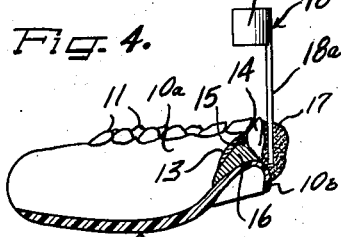
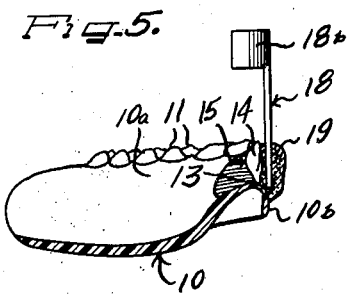
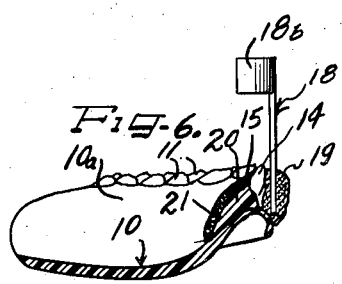
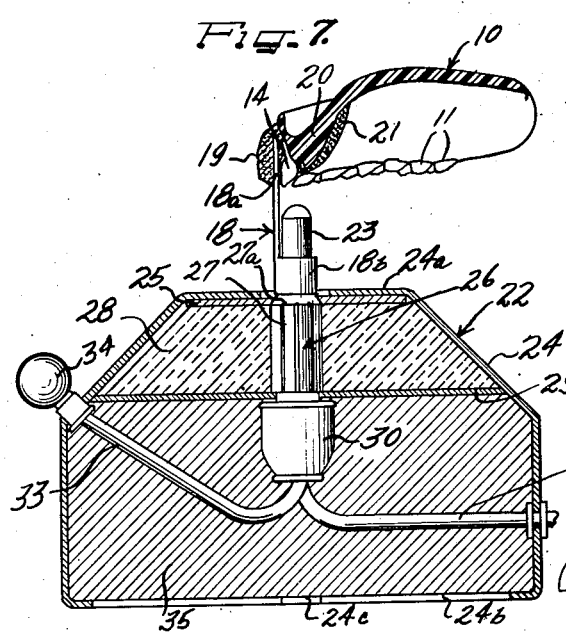
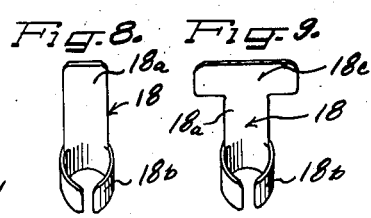
INVENTOR.
WALTER GIESE
BY
Attys.

Patented May 10, 1949

2,469,822

UNITED STATES PATENT OFFICE 2,469,822

PROCESS FOR BONDING TEETH TO
DENTAL PLATES

Walter Giese, Chicago, Ill.

Application August 31, 1946, Serial No. 694,341

3 Claims. (Cl. 18—55.1)

This invention relates to the replacement or tightening of broken-out or loosened teeth in a dental plate.

Specifically the invention deals with a greatly simplified method of replacing broken out teeth in dental plates, and includes apparatus for carrying out the process.

According to this invention, the dental plate, having a tooth broken out of its mounting in the plate, can be quickly repaired without evidence of patching or other repair work. The invention is operative with the commonly used vulcanized rubber dental plates as well with the new plastic material dental plates such as acrylic resin plates.

Heretofore when a tooth was broken out of, or loosened from, a dental plate it was necessary for the dentist to send the plate to a dental laboratory for undergoing a complicated process, involving complete investment of the plate in a mold, to replace the broken out tooth. The present invention now so greatly simplifies the replacement of loosened or broken out teeth in dental plates that it is possible for the dentist himself to quickly replace the broken out or loosened tooth and return the repaired plate to the patient within an hour or so. As a result of the invention, it is no longer necessary for plate wearers to carry an extra set of plates, or to go without their plates while they are being repaired.

According to this invention, a dental plate with one or more broken out teeth is first cut and scraped to form a recess in the plate behind the tooth space in which the broken out tooth was set. A new tooth, or the broken out old tooth if undamaged, is then set in the tooth space and a dab of dental wax is pressed into the recess and against the back face of the tooth for temporarily holding the tooth in position. Plaster of Paris is then spread across the front face of the wax-held tooth and across the front faces of the adjacent teeth to form a dam or bridge. A relatively thin strip of heat-conducting material such as copper, aluminum, or the like is inserted into the plaster covering before the plaster has set. The strip is positioned to lie in closely spaced relation in front of the wax-held tooth and in spaced relation from the material of the dental plate. The plaster of Paris is then allowed to set. The wax is next melted out of the recess and this recess is packed with unset thermosetting material preferably of the same composition as the plate material. The thermosetting material is shaped to fill the recess and is also pressed against the back face of the tooth to continue the normal contour of the plate. After the thermosetting material is shaped to the proper contour, it is covered with plaster of Paris and the entire tooth may be invested in plaster of Paris. The metal strip is next heated, preferably by contact with an electrically heated element, and the heated strip will heat the set plaster of Paris for setting the thermosetting material into intimate bonded relation with the tooth and the plate. After the setting or curing operation the plaster of Paris is broken off of the plate and tooth, the thermoset material is ground if necessary, and polished, and the repaired plate is ready for immediate use.

A feature of the invention is the speed with which the process can be carried out so that lost wearing time of a dental plate is reduced to a minimum.

A further feature of the invention resides in the use of localized heat to set the bonding material for the tooth so that the plate will not be burned or scorched and thereby discolored.

It is, then, an object of this invention to provide a process of quickly repairing dental plates without investing the entire plate in a mold and without subjecting the entire plate to heat.

A further object of the invention is to provide a method of quickly replacing broken out teeth in dental plates without discoloring even the most heat-sensitive plate material.

A still further object of the invention is to provide a process for vulcanizing a new tooth in position in a dental plate with localized heat supplied to a small plaster mold formed around the tooth being replaced.

A specific object of the invention is to provide a process for replacing teeth in dental plates by investing the new tooth and the adjoining teeth and plate areas only in a plaster mold, followed by a localized heating of the mold to set thermosetting material of the same composition as the plate and also invested in the mold.

A specific object of the invention is to provide heating strips and a heating element for locally heating a plaster cast on a dental plate without scorching the plate.

Other and further objects of the invention will be apparent to those skilled in the art from the following detailed description of the annexed sheet of drawings which, by way of a preferred example only, illustrates one embodiment of the invention.

On the drawings:

Figure 1 is a fragmentary plan view of a dental plate having a tooth removed and having the area behind the tooth space recessed in accordance with this invention.

Figure 2 is a cross-sectional view taken along the line II—II of Figure 1 but illustrating a new tooth held in the tooth space by means of a dab of wax seated in the recess.

Figure 3 is a plan view similar to Figure 1 but illustrating the plaster mold formed around the front faces of the tooth being replaced and the adjacent teeth.

Figure 4 is a cross-sectional view taken along the line IV—IV of Figure 3.

Figure 5 is a view similar to Figure 4 but illustrating the wax removed from the recess.

Figure 6 is a view similar to Figure 4 but illustrating the thermosetting material packed in the recess and against the tooth and also showing the manner in which the material is covered with a mold.

Figure 7 is a vertical cross-sectional view taken through a heating unit illustrating the manner in which the assembly of Figure 6 is mounted thereon for the heating operation.

Figure 8 is an isometric view of one form of heating strip according to this invention, suitable for use in the replacement of a single tooth on a dental plate.

Figure 9 is a view similar to Figure 8 but illustrating a heating strip suitable for use in replacing a plurality of adjacent teeth in a dental plate.

As shown on the drawings:

As illustrated in Figure 1, a dental plate 10 with the conventional teeth 11 anchored therein, has a blank tooth space 12 formed by a broken out tooth. As is conventional, the lingual side of the gingival portion 10a of the plate 10 is built up between the teeth 11 and to a level only slightly below the occlusal surfaces of the teeth. This lingual side of the gingival portion has a good bonding and backing up area for the teeth, so that they will be firmly attached to the plate.

In accordance with this invention the lingual side of the gingival portion 10a is first recessed at 13 behind the tooth space 12. The recess is provided by cutting out some of the plate material with a scraping or grinding action. The walls of the recess will be relatively rough to afford good anchoring surfaces.

As shown in Figure 2, a new tooth 14 is positioned in the tooth space 12 and, of course, is sized and selected to match with the adjoining teeth and to fit the tooth space. If the broken out tooth is undamaged, it may be re-used. The lingual side of the new tooth 14, as is conventional, is equipped with anchoring pins such as 15.

The recess 13 is next preferably filled with a dab of wax 16 which is firmly pressed into the recess and against the lingual side of the new tooth 14 to temporarily anchor the tooth in proper position in the tooth space 12.

As shown in Figures 3 and 4, the front face of the new tooth 14 and the front faces of the adjoining teeth 11 together with the buccal gingival portion 10b of the plate 10 is invested in plaster of Paris 17. This plaster of Paris extends locally around the new tooth 14, as shown, and only a small amount need be used. Before the plaster of Paris is set, the strip end 18a of a heat-conducting fitting 18 is inserted therein to lie in closely spaced relation in front of the new tooth and in closely spaced relation from the plate, as best shown in Figure 4. This fitting 18 is composed of heat-conducting metal such as aluminum or copper and has the strip portion 18a thereof sized to just about span the width of the tooth 14. A collar 18b is provided on the end of the strip portion 18a for a purpose to be hereinafter described.

The plaster 17 is allowed to set, and a rigid mold 19 with the strip 18 embedded therein is formed as shown in Figure 5. This mold firmly anchors the tooth 14 to the plate 10. The wax 16 is next melted out of the recess 13 to fully expose the recess as shown in Figure 5. The recess 13 is next packed with thermosetting bonding material 20 as shown in Figure 6, and this thermosetting material, which has the consistency of putty, is carefully worked into position in the recess to firmly engage the lingual side of the new tooth 14 and to receive the anchoring pins 15 completely therein. The packing of the bonding material will not shift the tooth 14, since the plaster mold 19 firmly anchors the tooth in position. The thermosetting material 20 is shaped to the contour of the lingual gingival portion, and is next covered with plaster of Paris 21 to coact with the mold 19 and totally invest the thermosetting material 20. After the plaster 21 has been set, both the new tooth 14, the adjoining teeth 11, the adjoining gingival portions 10a and 10b of the plate 10, the thermosetting material 20, and the tip end 18a of the fitting 18 are all completely invested in a rigid mold. The assembly is then mounted on a heating unit 22 shown in Figure 7. This unit 22 has a post 23 projecting upwardly from the top thereof and sized to receive the collar 18b of the fitting 18 thereon. The post 23 is heated to heat the collar 18b of the fitting 18 and thereby also heating the strip portion 18a to heat the mold 19 and the material invested therein including the thermosetting material 20. This material is gradually heated by conduction from the strip 18a and progressively sets into a thermoset bond permanently uniting the tooth 14 with the plate. Since the strip 18a is embedded at the exact place where the heat is desired, the heat can be exactly regulated to cure or vulcanize the plastic material 20 without burning or scorching the plate. As shown in Figure 7, all of the plate area with the exception of that immediately surrounding the tooth 14 is uncovered and is unheated.

The unit 22 includes a casing 24 of metal or the like with an apertured end wall 24a, and an open bottom 24b. A fiber or other insulating washer 25 is inserted in the casing and bottomed against the end wall 24a. A heating element 26 has a porcelain portion 27 with a shoulder 27a at the base of the post 23 snugly seated in the washer 25. This centers the post 23 in the aperture of the top wall 24a thereby spacing the post from the casing 24. The element 26 has the porcelain portion 27 thereof surrounded by heat-insulating material such as asbestos 28. This asbestos 28, in turn, is bottomed by a cover or wall 29 and an electrical conduit fitting 30 for the element 26 depends beneath the wall. A wire cord 31 extends from the fitting 30 through the casing to a plug 32 for supplying current to the element. A second wire 33 extends from the fitting 31 through the casing to a tell-tale light 34. The light 34 will be lit whenever current is being fed to the element 26. The casing 24 beneath the partition wall 29 is preferably completely filled with plaster, cement, or other ceramic material 35, and tabs 24c are turned under the said material 35 to hold it in the casing 24 as shown. These tabs 24c are integral with the casing.

The unit 10 affords a good base for supporting the assembly as shown in Figure 7, and the insulation 28 eliminates the heating of the plate except through the fitting 18.

As best shown in Figure 8, the fitting 18 is conveniently formed from sheet or strip material, and the collar portion 18b thereof is split and easily formed from two ears on the strip.

In the event that two or more adjacent teeth are to be replaced in the plate, it may be desirable to provide a head or elongated portion 18c on the strip 18 as shown in Figure 9. This portion 18c will be embedded in the plaster 17 in the same manner described hereinabove but will bridge several tooth spaces to lie in closely spaced relation in front of several teeth. The head 18c can be made as long as is necessary to bridge the tooth spaces.

From the above descriptions it will be understood that this invention provides a process of quickly replacing broken out or loosened teeth in dental plates without involving the investing of the complete plate in a mold and without ever subjecting the complete mold to a heat treatment. The process utilizes an insert fitting of heat-conducting material to supply heat to a thermosetting or bonding agent which is invested in a plaster of Paris mold that only surrounds the immediate vicinity of the tooth being replaced. The invention also includes the apparatus for effecting the localized heating.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of securing a tooth in fixed position in the tooth space of a dental plate which comprises cutting a recess behind the tooth space in the plate, positioning a tooth in the tooth space, pressing a dab of wax in the recess and against the lingual face of the tooth to temporarily hold the tooth in position in the plate, covering the buccal face of the tooth and the adjoining buccal surface of the gingival portion of the plate with plastic plaster of Paris, inserting a heat-conducting fitting into the plaster in closely spaced relation to the tooth and plate, allowing the plaster to set, melting out the wax, pressing thermosetting plastic bonding material into the recess against the lingual face of the tooth, molding the bonding material to build up the recessed portion into conformity with the lingual gingival plate portion, covering the molded bonding material with plaster of Paris, allowing the plaster of Paris to set, and heating the heat-conducting fitting for setting the bonding material.

2. The process of replacing a broken out tooth in a dental plate which comprises cutting a recess in the lingual gingival portion of the plate immediately adjacent the tooth space created by the broken out tooth, inserting a new tooth in the tooth space, investing the buccal sides of the new tooth and the adjoining gingival portion of the plate with plaster, embedding a heat-conductive strip into the plaster in closely spaced relation from the new tooth and plate, allowing the plaster to set to fixedly hold the new tooth on the plate, filling the recess with thermosetting plastic material, packing the thermosetting plastic material against the lingual face of the new tooth in firm anchoring relation therewith, investing the thermosetting plastic material in plaster, and heating the strip to thermoset the invested plastic material for integrally bonding the new tooth to the plate.

3. The method of replacing broken out teeth in dental plates without subjecting the plate to heating action sufficient to cause discoloration which comprises inserting a new tooth in position on the plate, investing the buccal surfaces of the new tooth, the adjoining teeth, and the gingival portion of the plate in plaster, embedding a heat-conductive strip in the plaster, allowing the plaster to set, packing thermosetting material against the lingual face of the new tooth, molding the plastic material to the lingual gingival contour of the plate, investing the thermosetting material in plaster, and heating the strip to set the thermosetting plastic material for integrally bonding the new tooth to the plate.

WALTER GIESE.

REFERENCES CITED

The following references are of record in the file of this patent:

UNITED STATES PATENTS

| Number | Name | Date |
| --- | --- | --- |
| 908,627 | Telle | Jan. 5, 1909 |
| 2,245,849 | Ballard | June 17, 1941 |
| 2,317,008 | Werner | Apr. 20, 1943 |
| 2,356,447 | Cline | Aug. 22, 1944 |
| 2,395,241 | Allen | Feb. 19, 1946 |